US007793351B2

(12) United States Patent
Green

(10) Patent No.: US 7,793,351 B2
(45) Date of Patent: Sep. 7, 2010

(54) COPY DETERRENT FOR AN AUDIOVISUAL PRODUCT

(75) Inventor: Stuart Green, Sheffield (GB)

(73) Assignee: Zoo Digital Limited (GB)

(*) Notice: Subject to any disclaimer, the term of this patent is extended or adjusted under 35 U.S.C. 154(b) by 775 days.

(21) Appl. No.: 11/786,923

(22) Filed: Apr. 13, 2007

(65) Prior Publication Data

US 2008/0040809 A1 Feb. 14, 2008

Related U.S. Application Data

(63) Continuation of application No. PCT/GB2005/003977, filed on Oct. 14, 2005.

(60) Provisional application No. 60/644,269, filed on Jan. 14, 2005.

(30) Foreign Application Priority Data

Oct. 15, 2004 (GB) ................. 0422960.5

(51) Int. Cl.
*H04L 9/00* (2006.01)
(52) U.S. Cl. .................. 726/26; 726/27; 713/176
(58) Field of Classification Search ......... 380/200–203; 713/176, 187, 189, 192–194; 705/57–59; 726/26–33; 369/84
See application file for complete search history.

(56) References Cited

U.S. PATENT DOCUMENTS

| 5,080,479 | A | 1/1992 | Rosenberg |
| 6,430,360 | B1 | 8/2002 | Oh et al. |
| 6,694,090 | B1 | 2/2004 | Lewis et al. |
| 2001/0037459 | A1 | 11/2001 | Ogawa et al. |
| 2002/0097870 | A1 | 7/2002 | Nelson |
| 2003/0128454 | A1* | 7/2003 | Basham et al. ......... 360/69 |

(Continued)

FOREIGN PATENT DOCUMENTS

AU 764069 B2 5/2000

(Continued)

OTHER PUBLICATIONS

Byer, S., et al.: "Analysis of Security Vulnerabilities in the Movie Production and Distribution Process", 2003, pp. 1-12.

*Primary Examiner*—Hosuk Song
(74) *Attorney, Agent, or Firm*—Daniels W. Roberts; Law Offices of Daniel W. Roberts, LLC

(57) ABSTRACT

A copy deterrent is provided for an audiovisual product (400) such as a DVD-video format optical disk. User identities are allocated to each of a plurality of users. The audiovisual product (400) is then recorded including, for each allocated user identity, a section of playback content (421) unique to that allocated user identity, e.g. a video object (VOB) which prominently displays personal data of the user (such as their name) or which contains a discrete digital watermark. The user enters a user identity code (80) upon playback and the recorded audiovisual product (400) is reproduced including selecting a corresponding section of the unique playback content according to the received user identity. A single version of the disk is recorded and sent to all users, but playback is personalised to each of the users individually. This is a strong deterrent against copying of the audio and video playback e.g. with a VCR or other recording device.

35 Claims, 9 Drawing Sheets

U.S. PATENT DOCUMENTS

2003/0138127 A1  7/2003  Miller et al.
2004/0111611 A1  6/2004  Jin et al.

FOREIGN PATENT DOCUMENTS

| | | | |
|---|---|---|---|
| EP | 1148488 | A2 | 10/2001 |
| EP | 1465047 | A1 | 10/2004 |
| GB | 2361136 | A  | 10/2001 |
| WO | 9919822 |    | 4/1999  |

* cited by examiner

COPY DETERRENT FOR AN AUDIOVISUAL PRODUCT

This is a continuation of International Patent Application No. PCT/GB2005/003977, entitled "COPY DETERRENT FOR AN AUDIOVISUAL PRODUCT," filed on Oct. 14, 2005, which claims priority to U.S. Provisional Patent Application No. 60/644,269 filed on Jan. 14, 2005 and further claims priority to British Application No. GB 04 22960.5 filed on Oct. 15, 2004. The contents and teachings of these applications are hereby incorporated by reference in their entirety.

The present invention relates in general to a method and apparatus for use in deterring copying of an audiovisual product, and to an audiovisual product including a copy deterrent.

Many situations arise where it is desired to provide a confidential or commercially sensitive audiovisual presentation to a selected audience. As one example, movie studios often release preview versions ("screener discs") of forthcoming movies to an authorised group of users including, for example, studio executives, critics, journalists and award judges. Unfortunately, the group of authorised users is relatively large, and it is difficult to completely control distribution of the audiovisual product. In particular, there is a tendency for illegal copies of the product to leak from the group of authorised users. Movies are just one example, and the same situation arises in other fields.

Since the audiovisual product is being distributed to authorised users, security approaches such as copy prevention or locking the product are often ineffective. In particular, a weakness has been identified in that the authorised user is able to copy the audiovisual product at the point of display or playback of the product. For example, an audiovisual product distributed on an optical disc recording medium can be provided with copy prevention features which make it difficult to directly copy from one optical disc to another. However, when the audiovisual product is replayed to a television screen or monitor, it is then relatively easy to copy the reproduced playback signals such as with a video cassette recorder or personal digital recorder. Whilst the quality of the illegal copy is likely to be much lower than the original product, unfortunately authorised users are occasionally tempted by commercial gain to allow such copying operations.

An aspect of the present invention is to address the problems of the prior art, as discussed above or otherwise. Illustrative, non-limiting embodiments of the present invention may overcome the above disadvantages and other disadvantages not described above. The present invention is not necessarily required to overcome any of the disadvantages described above, and the illustrative, non-limiting embodiments of the present invention may not overcome any of the problems described above. The appended claims should be consulted to ascertain the true scope of the invention.

According to the present invention there is provided an apparatus, method and an audiovisual product as set forth in the appended claims. Preferred features of the invention will be apparent from the dependent claims, and the description which follows.

The embodiments of the present invention discussed herein assist in deterring copying of an audiovisual product, and provide an audiovisual product incorporating a copy deterrent. The preferred embodiments of the present invention are particularly effective to deter copying of an audiovisual product while the audiovisual product is being replayed by an authorised user.

In one general aspect of the present invention there is provided a method to deter copying of an audiovisual product.

A first stage in the method relates to recordal of the audiovisual product on a suitable recording medium. User identities are allocated to each of a plurality of users. The audiovisual product is then recorded including, for each allocated user identity, a section of personalised playback content which is unique to that allocated user identity. For example, the name of the person is embedded into a section of video data.

A second stage relates to playback of the audiovisual product. One of the previously allocated user identities is received, such as by being input by the user. The recorded audiovisual product is then replayed including, in amongst the output sections of playback content, a selected one of the sections of personalised playback content which is unique to the received user identity. For example, the person's name is displayed during presentation of the recorded video data. Hence, playback of the audiovisual product becomes adapted to the received user identity and any copy made of the playback will carry this information. The copy is then more readily traced back to the user, which provides a highly defective deterrent against copying.

One aspect of the present invention concerns the copy deterrent method discussed herein. The present invention also extends to a method of recording an audiovisual product and, separately, to a method of reproducing the audiovisual product. Further, the present invention extends to an apparatus adapted to perform any of the methods discussed herein. In particular, the invention extends to a dedicated authoring apparatus, and a dedicated recording or reproduction apparatus. In some preferred aspects, the invention also extends to a general-purpose computing device adapted or programmed to perform any of the methods discussed herein.

In a further aspect, the present invention provides an audiovisual product having a plurality of sections of personalised playback content each of which is uniquely attributable to one of a plurality of user identities. Also, the audiovisual product may have a navigational structure which includes a plurality of sequence instructions to reproduce some or all sections of playback content in a specified order, including selecting amongst the sections of personalised playback content according to a specified one of the plurality of user identities.

In a still further aspect, the present invention provides a method of creating an optical disk product. An audiovisual product as discussed herein is received, such as from an external source or by retrieving the audiovisual product from a local storage. The audiovisual product is then recorded onto an optical disk recording medium to form the optical disk product. This aspect of the method is suitably performed on a commercial scale, such as in a replication or distribution plant, to make multiple identical copies of a master version of the audiovisual product for distribution to each of a plurality of users.

For a better understanding of the invention, and to show how embodiments of the same may be carried into effect, reference will now be made, by way of example, to the accompanying diagrammatic drawings in which.

Figure 1:
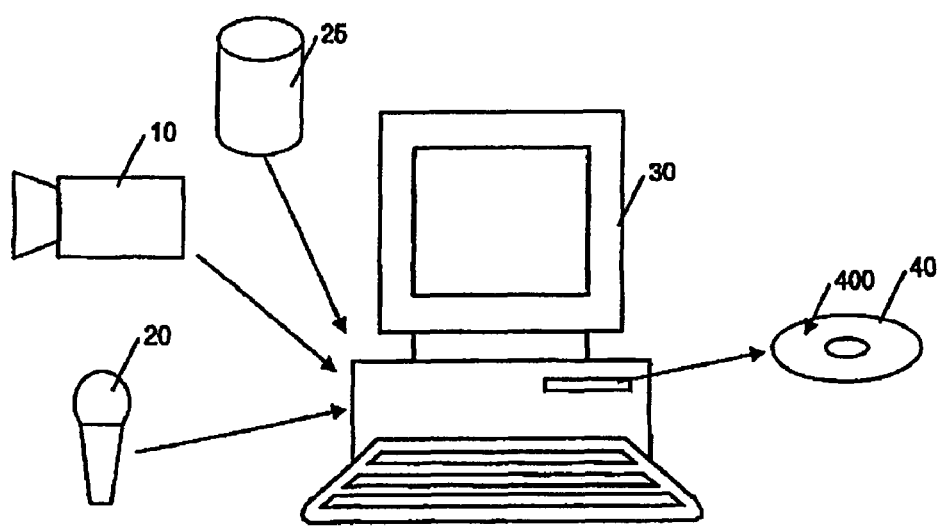
FIG. 1 is a schematic overview of an authoring apparatus.

In general terms, an audiovisual product such as a movie or other presentation is formed by gathering together many small sections or clips of raw audio and visual content. This is usually termed an authoring process, wherein the raw sound clips and video clips are progressively assembled and edited together to form the finished audiovisual product. The audiovisual product is then recorded on some form of recording media. Traditionally, this would be an analogue medium such as celluloid film or analogue video tape (e.g. VHS format video tape). More recently, it has become possible to record audiovisual content onto random access media including in particular optical disc media such as DVDS, or other forms of random storage such as magnetic hard drives. These random access media have many advantages in terms of size, data capacity, playback speed, image quality and so on. However, a disadvantage has also been identified in that it is relatively easy to copy a stored audiovisual product.

An optical disc is a convenient storage media for many different purposes. A digital versatile disc (DVD) has been developed with a capacity of up to 4.7 Gb on a single-sided single-layer disc, and up to 17 Gb on a double-sided double-layer disc. There are presently several different formats for recording data onto an optical disc, including application data formats such as DVD-Video and DVD-Audio, amongst others. Of these, DVD-Video is particularly intended for use with pre-recorded video content, such as a motion picture. As a result of the large storage capacity and ease of use, DVD discs are becoming popular and commercially important. Conveniently, a DVD-Video disc is played using a dedicated playback device with relatively simple user controls, and DVD players for playing DVD-Video discs are becoming relatively widespread. More detailed background information concerning the DVD-Video specification is available from DVD Forum at www.dvdforum.org, and elsewhere.

The DVD-Video specification contains a number of built-in copy-protection features that aim to protect the audiovisual data content of the disc. These include Content Scrambling System (CSS), used to encrypt blocks of audio-video data to prevent such data being played separately from the DVD-Video presentation; and Macrovision Copy Protection, used to prevent video being copied using recording devices. Both of these systems are interpreted by the DVD-Video player that performs the appropriate function during playback. Unfortunately, these approaches do not prevent copying of the audiovisual product at the point of playback, and especially when the playback is provided by an authorised user.

The preferred embodiment of the present invention will be described with reference to the particular example of a DVD-Video format optical disc containing audiovisual content. However, it will be appreciated that the invention is applicable to a wide variety of other environments, particularly where audiovisual content is stored in some form of random access storage media. Also, it is envisaged that the DVD-Video format will itself be superseded over time and replaced with new format definitions. At the moment, Blu-Ray™ and HD-DVD formats are being developed. That is, the present invention is applicable even in these future environments.

FIG. 1 shows an example authoring apparatus as employed in preferred embodiments of the present invention. In this embodiment, the authoring apparatus includes a general purpose computing platform 30 such as a client-server computer system, or a stand-alone personal computer. Alternatively, the method is implemented, wholly or at least in part, by dedicated authoring hardware.

Conveniently, an authoring method of the present invention is implemented as a program, or a suite of programs, running on the computing platform 30. The program or programs are recorded on any suitable recording medium, including a removable storage such as a magnetic disk, hard disk or solid state memory card, or as a signal modulated onto a carrier for transmission on any suitable data network, such as the Internet.

In FIG. 1, the computing platform 30 receives raw audio and video data such as through a camera 10 and a microphone 20. Alternatively, the raw audio and video assets are provided from other sources such as a file storage device 25, or are created within the authoring apparatus 30 such as by image and sound creation software. The raw content data may include video clips, audio clips, still picture images, icons, button images and other content to be presented visually or aurally upon playback of the audiovisual product. The raw content is suitably in the form of MPEG or JPEG encoded files, but may take any suitable format.

The audiovisual product 400 can take any form such as a movie, or a company presentation, or a quiz game, amongst many other possibilities. The personal computer 30 acting as the authoring apparatus creates the desired audiovisual product as will be discussed in more detail below. The authoring apparatus 30 writes the audiovisual product 400 onto a storage medium such as a hard disc drive within the personal computer 30 or onto an optical disc 40.

Figure 2:
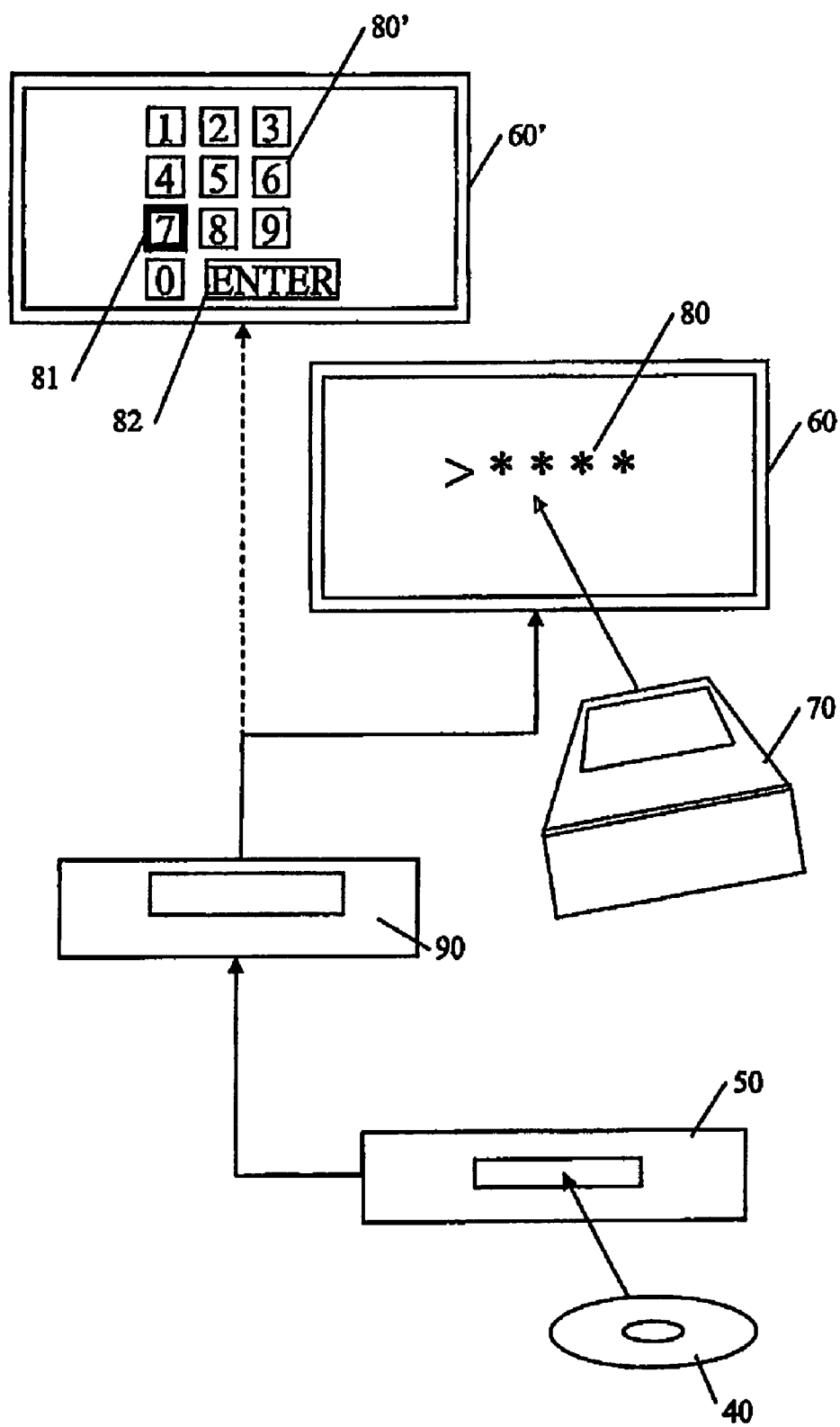
FIG. 2 is a schematic overview of a playback apparatus.

FIG. 2 is a general overview of an apparatus for reproducing the audiovisual product 400, as employed in preferred embodiments of the present invention. The audiovisual product 400 on the optical disc 40 is received into a playback apparatus, in this case including a DVD player 50 and television screen 60 (or, alternatively, television screen 60'). User controls are provided such as through a remote control handset 70. As will be explained in more detail below, in one example embodiment, the audiovisual product 400 is controlled according to user input of an access code or PIN-code 80. As shown in FIG. 2, the access code 80 is presented on the television screen 60 in response to user inputs through the remote control apparatus 70. In another example embodiment, user input in the form of an access code or PIN-code is entered by using a representation 80' of a keypad on a television screen 60'. Such a screen representation 80' may be generated using DVD menu functionality, or the like, whereby the user uses arrow keys on a standard remote control apparatus to move between and highlight numbers 81 on the keypad 80' and presses "OK" (or an equivalent "affirmative" key) on the remote control apparatus 70 to select each number in turn. Any numerical sequence or (if an alphanumeric keyboard is represented instead) alphanumeric sequence may be entered in this manner. The user then presses a representation of an "ENTER" button 82 on the screen after all numbers or characters have been entered in order to complete the operation.

It is anticipated that it might be perceived as onerous to have to enter a long sequence of characters using a keypad 80', or similar mechanism, on each desired playback of the content. Accordingly, it would be possible to provide a remote control apparatus, for example of a known programmable kind, which is programmed with the particular sequence of arrow and OK key press signals necessary to enter the characters. For example, if there is a need to enter a ten digit PIN-code, the remote control apparatus would be programmed with the appropriate sequence of arrow and OK key signals respectively to move the selection between, and then select, all required digits followed by "ENTER" 82. It is envisaged that either a user could program such a remote control apparatus in a known way or the remote control apparatus could be provided, pre-programmed, with the media containing the audiovisual content.

Figure 3:
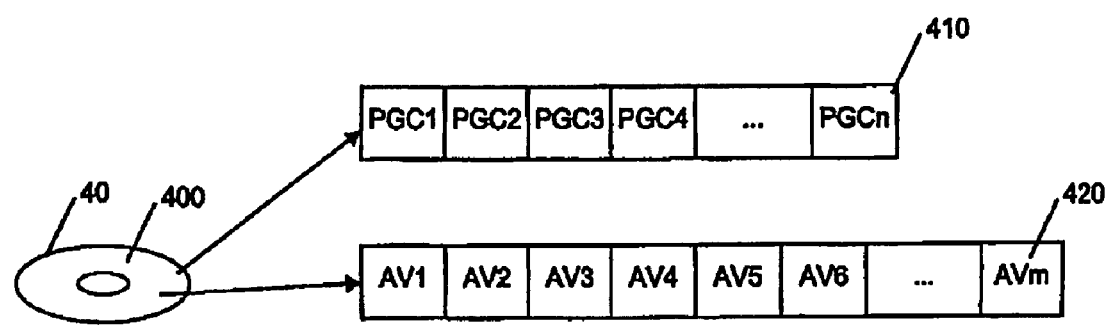
FIG. 3 is a schematic overview of an audiovisual product.

FIG. 3 shows a structure of the audiovisual product 400 in more detail. The audiovisual product 400 includes a plurality of cells 420, in this case represented by cells AV1, AV2 . . . AVm. Each cell 420 contains a short section of audiovisual data. The cells are played in sequence, typically one after the other, in order to deliver the intended audiovisual presentation, under control of a playback sequence instruction 410. The sequence instructions 410 as shown in FIG. 3 are separate from the cells 420. Suitably, the cells 420 and the sequence instructions 410 are each allocated to structure locations within the audiovisual product, so as to enable navigation between instructions 410 and from instructions 410 to cells 420.

In the preferred example of DVD-Video format data, the cells 420 are played in sequence through their inclusion by reference in programs (PGs) which are in turn organised into Program Chains (PGCs). In FIG. 3, the sequence instructions 410 are represented by Program Chains PGC1, PGC2 . . . PGCn.

The DVD-Video specification provides a structure known as a Video Object (VOB) to hold streams of audiovisual data. Each VOB includes at least one video stream, zero or more audio streams, and zero or more sub-picture streams. The VOBs are internally divided into the cells 420. An audiovisual program is presented by playing a series of the VOBs in a pre-defined sequence, using Programs and Program Chains (PGCs) 410. In the current DVD-Video specification, VOBs contain from one to nine video streams (often referred to as multi-angle streams), from zero to eight multi-channel audio streams, and from zero to 32 sub-picture streams.

Despite various copy protection measures, there is a fundamental point of weakness where the audiovisual product is reproduced on the display screen 60. In particular, it is relatively easy to intercept the display signal such as with a video cassette recorder (VCR) or personal digital recorder (PDR) 90 as illustrated in FIG. 2. By copying the display at the point of playback, an unauthorised copy of the audiovisual product can be made.

With this problem in mind, the present invention provides a strong and effective deterrent against copying of the audiovisual product.

Overview

Figure 4:
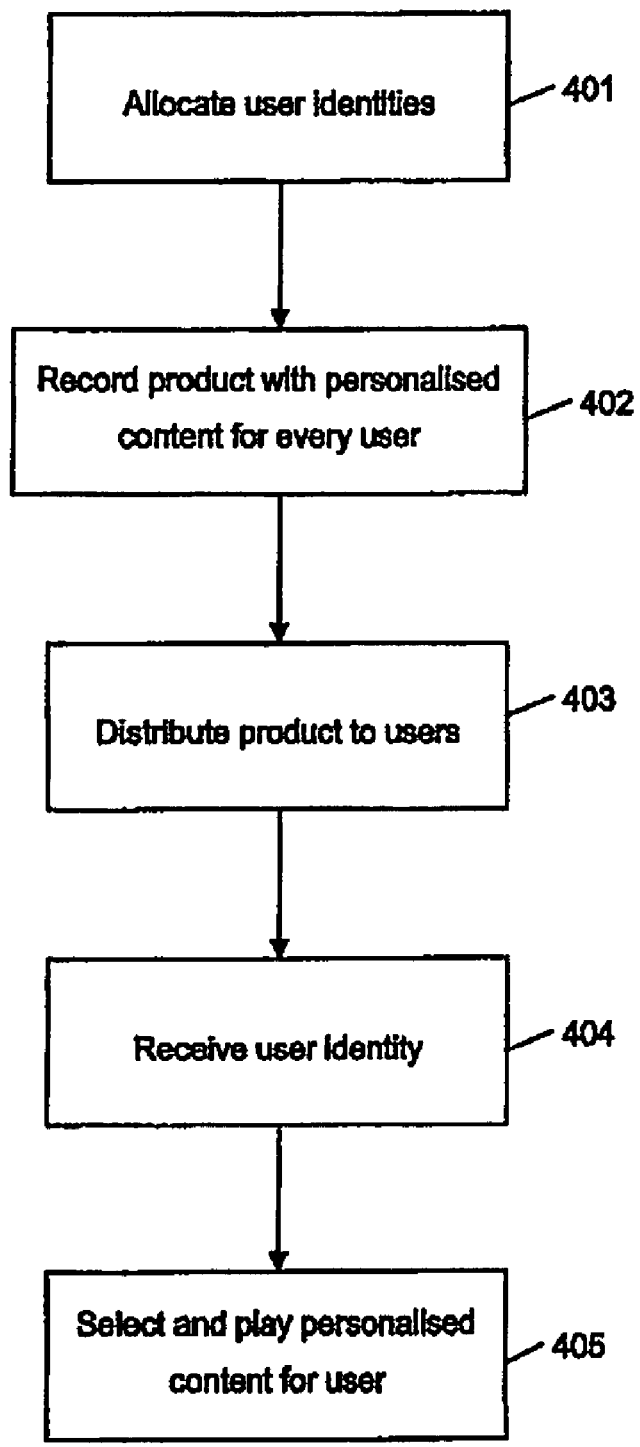
FIG. 4 is a schematic overview of a preferred method to deter copying of an audiovisual product.

FIG. 4 is an overview of a preferred method to deter copying of an audiovisual product.

In FIG. 4, the method includes allocating user identities to each of a plurality of users at step 401. In an example embodiment, the audiovisual product is a preview version of a forthcoming movie (commonly known as a "screener" disc) which will be distributed such as to studio executives, journalist, critics, award judges and others. The circulation list of authorised users is relatively large, and often includes several hundred or even several thousand people.

In the preferred embodiment the user identity is unique to each authorised user or group of users. The user identity may itself take any suitable form. In an example embodiment the user identity is a code or number allocated to that user or group of users. Conveniently the user identities are held initially in a mailing database or equivalent, in order to match each allocated user identity to the relevant user or group of users. That is, the user database preferably includes at least (a) user identity codes and (b) personal data of each user.

At step 402 the method comprises recording the audiovisual product including, for each allocated user identity, a section of playback content unique to the allocated user identity. That is, the AV product is authored and recorded onto an appropriate medium such as an optical disc 40 including a section of playback content which uniquely identifies each of the allocated user identities. In the preferred embodiment, a section of playback content corresponds to video, audio or sub-picture data recorded in a cell as a minimum playback unit.

Under the current DVD-video specification, a section of playback content corresponds to one video stream, audio stream or sub-picture stream in a video object (VOB). The playback content is provided in a manner unique to the corresponding user identity such that displaying the playback content allows the allocated user identity to be determined. In a simple example the video stream is created including personal data such as the person's name or other identity information (e.g. a personal code), so that the personal information is displayed on screen when that section of playback content is played.

Each of these original audio or video assets is prepared and recorded during the authoring process. Some currently available authoring tools require that each asset be prepared manually. More recently, automated authoring tools have been made commercially available such as DVD-EXTRA STUDIO™ from ZOOtech Limited of Sheffield, United Kingdom, where the user database is employed to automatically create a corresponding set of audio or video assets. These assets are then recorded as sections of uniquely identifiable playback content in the audiovisual product.

Once the AV product has been recorded, it is then distributed to each of the authorised users at step 403. The same version of the audiovisual product is distributed to each of the users. That is, each of the users receives an identical copy of the audiovisual product. This avoids the need to separately create individual tapes or discs or other recording medium for each user. Creating individualised audiovisual products takes a long time, is costly and is error prone. It is not practical to inspect each copy, and it requires great care to ensure that the correct product is sent to the corresponding user. By contrast, in the preferred embodiments of the present invention a single version of the audiovisual products is distributed to each of the users, which is fast, simple and much more reliable.

This first part of the method is itself useful and provides a commercially valuable audiovisual product ready for distribution to the authorised users. There is however a separate second part of the method which is performed later as each copy of the audiovisual product is played by an authorised user.

Step 404 comprises receiving one of the allocated user identities. This step may include an authentication process or other validation of the user. For example, the user telephones a checking service (or visits a website) for authentication and provides personal information such as an invitation code in a letter or email addressed to them from the user database. In return, the user is given an individual unlocking code as their user identity. This process may take any suitable form and for the purposes of the present invention it is assumed that a valid user identity is received by the playback apparatus.

In one example embodiment the user identity is received electronically such as by a transmission of data from, say, a token carried by the user to a receiver on the playback device. However, in the preferred embodiment the user enters their user identity 80 (see FIG. 2) by a numerical keypad or equivalent (e.g. on the remote control handset 70 or by a screen representation of a keypad and using handset cursor controls). This is a relatively simple and straightforward procedure for the user and involves a minimum of complications and delay.

At step 405 the audiovisual product is reproduced, including selecting and reproducing the section of playback content unique to the allocated user identity. That is, upon playback there is a selection made to reproduce only the section of playback content unique to the received user identity. That is, the unique data is reproduced corresponding to the received user identity.

The audiovisual product preferably includes a mixture of common content and personalised playback content. Suitably, the method includes recording at least one common section of playback content to be reproduced for all of the plurality of users. For example, all of the users see an identical version of a movie trailer or other content in the audiovisual product. However, along with this common content, personalised playback content is also reproduced specific to the received user identity. As a result, the total playback experience is personalised to that specific user.

The personalised playback content can either be overt, or discrete, or a mixture of both. Overt playback content includes, for example, displaying a person's name or other personal information prominently upon the screen during playback. By contrast, discrete playback content provides information within the audio or visual output which is not noticeable to a casual observer and which preferably does not detract from their overall viewing pleasure. In either case, the personalised playback content allows reproduction of the audiovisual product to be traced to a particular user. Where the playback is copied, then such a copy is immediately traceable to a particular user. This acts as a highly effective deterrent against copying, since the user responsible for the copy has a high chance of being identified and caught.

Asset Preparation

Figure 5:
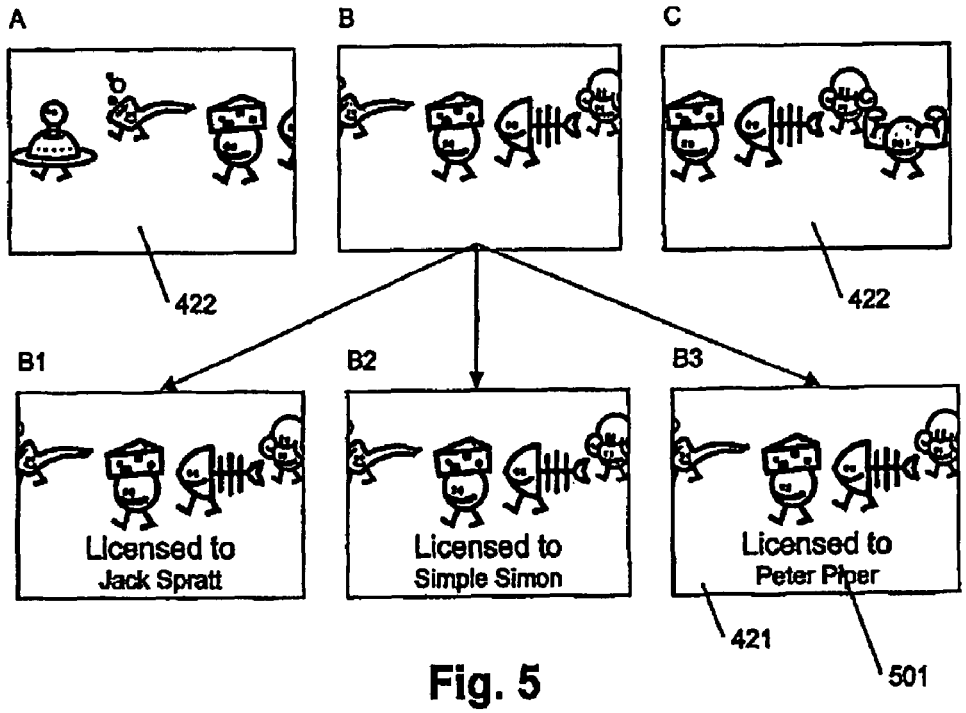
FIG. 5 shows personal playback content provided in the audiovisual product.

FIG. 5 shows an example video sequence divided into three sections labelled A, B & C. Conveniently, each section is recorded in a separate cell or VOB. In this example, sections A, B & C are retained in their original unmodified form and displayed as common content for all users. Also, section B is modified unique to each user. In the example of FIG. 5, multiple variants of sequence B are created each having an overt marking with the words "Licensed to [name]" where the name field is linked to the user. The product is then recorded including the common content 422 in cells A, B & C. Also, personalised playback content 421 is recorded with the modified video data of cells B1, B2 & B3. In this example, cell B1 presents the legend "Licensed to Jack Spratt", as shown in FIG. 5.

Navigational Preparation

Figure 6:
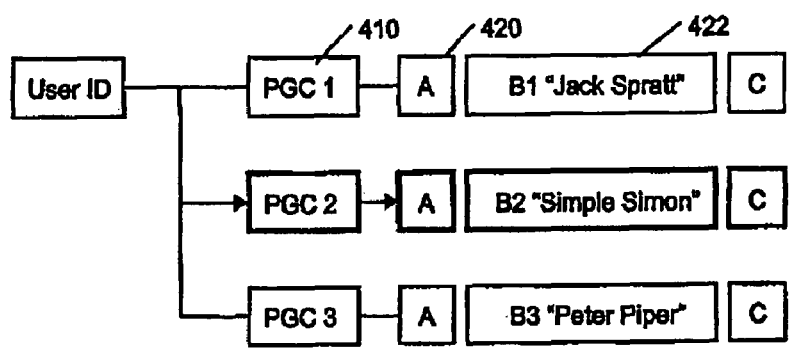
FIG. 6 shows a navigational structure of the audiovisual product.

FIG. 6 shows a schematic overview of navigational structure of the audiovisual product, which includes a plurality of sequence instructions 410 to reproduce some or all of the sections of playback content 420 in a specified order. As employed in example embodiments of the invention, the current DVD-video specification provides the playback sequences 410 suitably as programs or PGCs.

As shown in FIG. 6, on playback the received user identity 80 is used to select one of the stored sequence instructions (PGCs) 410. The selected sequence instruction 410 then controls a playback sequence to include the recorded section of personalised playback content 420 unique to that received user identity.

In the example of FIG. 6, the user identity "1234" links to PGC2 and reproduces the playback content A then B2 then C. The common content is reproduced for sections A and C, whilst section B2 is unique to the allocated user. In this case the personalised playback content B2 displays the overlaid or embedded wording "Licensed to Simple Simon".

In one example the received user identity directly provides the structural location of the corresponding sequence such that, say, user identity "1234" links to PGC#1234. However, a transformation step is preferred to indirectly derive the structural location from the received user identity. E.g. ID="1234" links to 10000-"ID"=PGC#8766. Many other transformations are possible, as will be apparent to the skilled person.

Interleaving

Only a limited amount of storage space is available in any recording medium, and it is desired to keep the audiovisual product as small as possible. Hence, in the preferred embodiments of the present invention the personalised marking is not displayed continuously. Instead, it is displayed only at predetermined times within a movie or upon predetermined events such as at the beginning of each chapter. That is, the personalised marking is interleaved between sections of common content.

Figure 7:
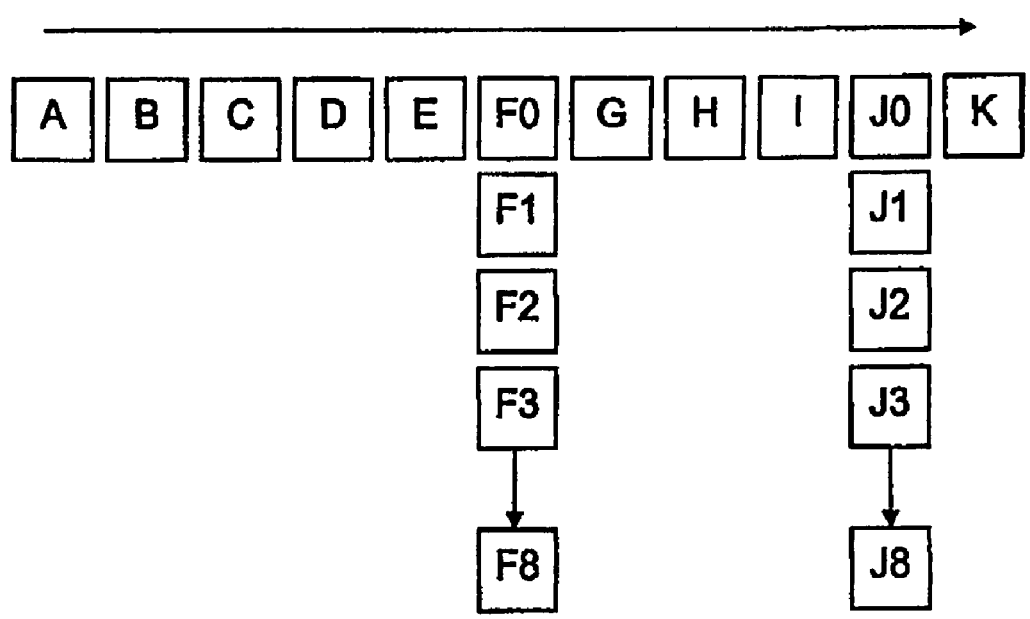
FIG. 7 illustrates navigational flow in the audiovisual product.

FIG. 7 shows a preferred example of interleaving personalised sections of playback content 421 amongst common content 422.

In FIG. 7 the playback content is divided into sections A-J which are conveniently intended for reproduction one after the other, although this is not necessarily always the case. In this example the common content of sections A-E is displayed first in sequence. Then at section F a choice is made whether to continue with common content (variant F0) which has no marking, or else display one of the available pre-recorded sections of personalised playback content F1, F2 etc. In this example section F represents the same portion of movie but overlaid with an overt marking such as a person's name displayed prominently on screen. The presentation then continues with common content of sections G, H & I. The personalised playback is then repeated in section J. Alternatively, where there are many users, it is convenient to display personalised marking for some of those users at section F (whilst the remainder see the common content F0) and then display personalised content for other users at section J (whilst the remainder see the unmodified common content J0).

The personalised playback content can be provided in any of the video stream, the audio stream, or a sub-picture stream. The sub-picture stream is most convenient in that it is commonly used for sub-titles and similar on-screen information displays and is readily adapted to contain text information personalised to a particular user. However, there is a weakness in that the sub-picture stream can be removed or suppressed when it is desired to make a copy of the video and audio streams. Therefore, it is preferred that the personalized content is embedded within the video steam (i.e. recorded as part of the video data) or embedded within the audio stream (i.e. recorded as part of the audio data).

Discrete Watermarking

Figure 8:
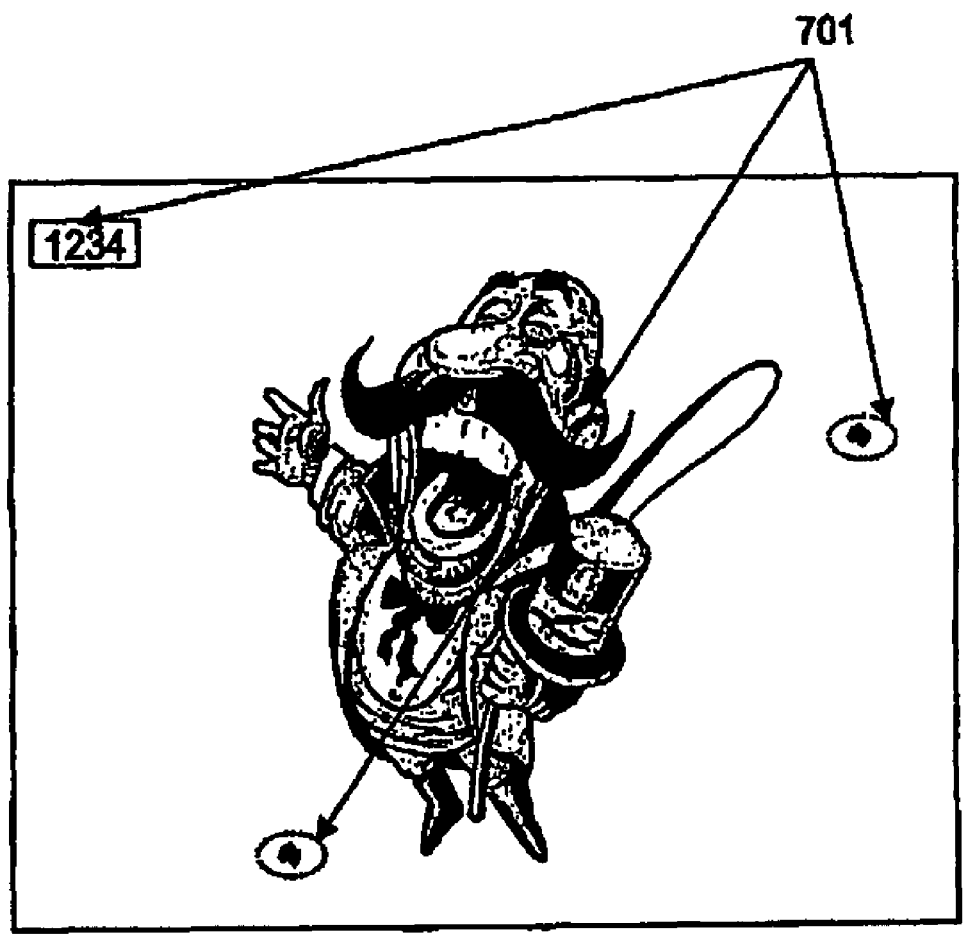
FIG. 8 shows an example of unique playback content incorporating a digital watermark.

FIG. 8 shows examples of personalised playback content in the form of discrete (or hidden) watermarking. Many different techniques are available to provide an audio or visual marking which is not normally noticeable to the user, but which is readily detected by an informed investigator.

As shown in FIG. 8, a digital watermark 701 is provided such as placed in a top left corner of the display screen. In this example the watermark appears as the digits "1234" or other personal data corresponding to the user identity.

As also shown in FIG. 8, the watermark may appear at different places in the image and may move to different positions at different times, i.e. spatially or temporally distributed, as will be familiar to those skilled in digital watermarking and steganography. The watermark may be made discrete by using small, irregular shapes or a colour that blends with surrounding video, so that the eye is not naturally drawn towards them. That is, the watermarking may be camouflaged.

Optionally, one or more erroneous watermarks are provided within the common content, so that it is not apparent to the ordinary user which watermarks are unique to their presentation and which are common to all users of the audiovisual product. This helps to inhibit attempts to mask or otherwise suppress the watermarking when copying the audiovisual product.

Stream Switching

As discussed above with reference to FIG. 3, Video Objects (VOBs) 420 can contain many video, audio and sub-picture streams. For example, a first VOB may contain a single video stream, while a second VOB may contain four video streams. A VOB that contains multiple video streams is often referred to as a "multi-angle block". In the current DVD-Video specification a Special Parameter 3 (SPRM3) is used to stipulate which video stream to play. This feature is designed to enable a viewer to choose between up to nine different camera angles and then to view the recorded video stream for the chosen camera angle.

Figure 9:
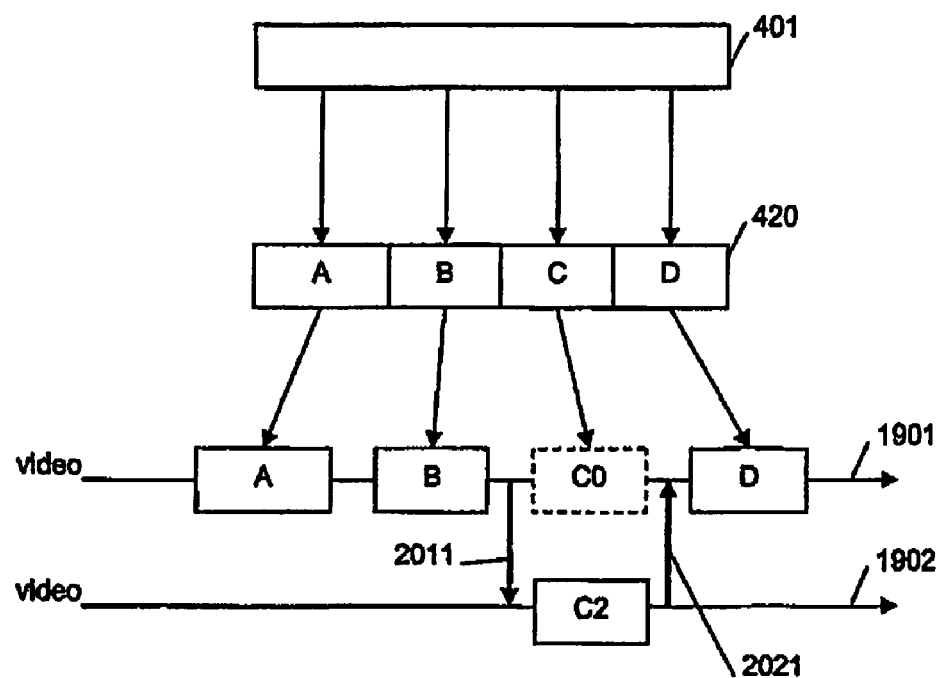
FIG. 9 is an example of navigational structure including a video stream switch.

As shown in FIG. 9, audiovisual data 401 having an intended playback sequence (e.g. a generally linear storyline) is divided into a plurality of cells 420, similar to the discussion above with reference to FIG. 7. In this example there are four sections of playback content in cells labelled A, B, C and D. The cells are divided amongst different video streams. That is, some of the cells (A B C0 D) are allocated to a first video stream 1901, whilst at least one cell (C2) is allocated to a different second video stream 1902. In order to play back the cells 402 in the desired sequence (A B C2 D), a video stream switch is required between the first stream 1901 and the second stream 1902. That is, at least one video stream switch instruction 2011,2021 is created in order to automatically switch from a first video stream 1901 to a second video stream 1902 during playback of the audiovisual product. Simply continuing with the first stream 1901 does not result in the desired playback sequence. In this example, simply continuing with the first video stream 1901 would reproduce the common content C0 instead of the personalised content in cell C2.

Figure 10:
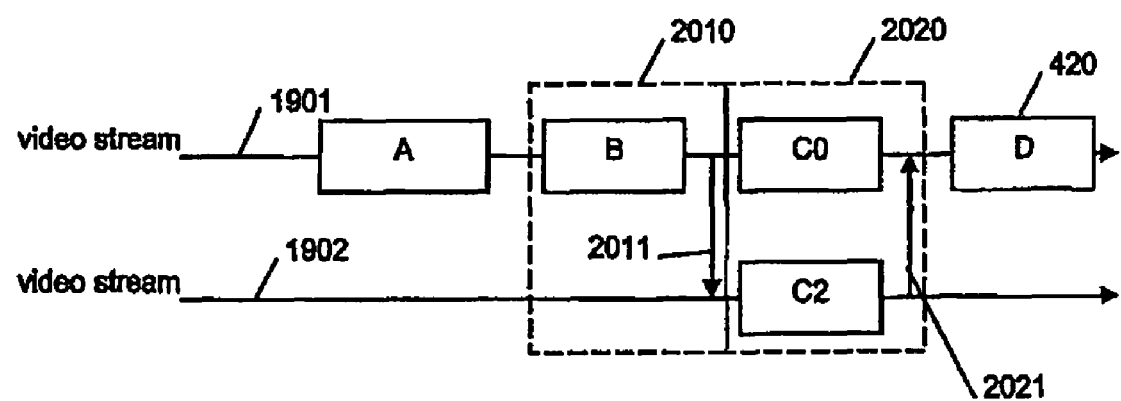
FIG. 10 is another example to illustrate video stream switching.

FIG. 10 shows the use of video streams within video objects (VOBs) in more detail. Conveniently, the cells 420 are contained within video objects (VOBs). Some of the cells (A,B,D) are held within simple VOBs 2010 having only one video stream. However, at least one video object 2020 is defined having a plurality of video streams 1901, 1902. The second video stream 1902 is provided by forming such a multi-stream video object (multi-angle block). The cell C2 is held in the second video stream 1902 within the multi-angle block 2020.

A sequence instruction (i.e. a PGC) is created to play back the VOBs 2010, 2020 in order, thereby reproducing the cells 420 A B C D. The playback sequence is further controlled by video stream switch instructions 2011, 2021 to switch between video streams 1901, 1902 at appropriate points in the sequence.

In the preferred embodiment, the video stream switch instructions 2011, 2021 are performed using forced activate button commands associated with hidden menu buttons in a video object 2010 which precedes one of the multi-angle blocks 2020. In this example, the VOB for cell B includes a switch command 2011 to set the SPRM3 special parameter to "2". The value "2" is conveniently stored in a general purpose register (GPRM) upon initialisation, according to the received user identity. An example stream switch instruction is in the form:

Set Stream SP GPRM1

Upon entering the following VOB for cell C as a multi-angle block, the set value of the special parameter SPRM3 determines that stream "2" is to be reproduced, in this case leading to cell C2. Also, in this example, the VOB 2020 for cell e likewise returns SPRM3 to a default value of "1" ready for a following cell.

Under current implementations of the DVD-Video specification, only a single command can be associated with a menu button. Therefore where it is necessary to perform a sequence of instructions, it is preferred to employ forced activate buttons in a number of successive cells, prior to encountering a multi-angle block. That is, a multi-line program is executed using instructions performed at the end of each of several preliminary VOBs in sequence, interleaved between each multi-angle block. Following this sequence, the Special Parameter SPRM3, which records the number of the video angle for playback, is set to the appropriate value.

INDUSTRIAL APPLICATION

In summary, the present invention provides an effective method for use in deterring copying of an audiovisual product, methods for recording and reproducing an audiovisual product, an apparatus adapted to record and reproduce such an audiovisual product, and an audiovisual product per se having copy deterrent features. In particular, uniquely identifiable playback content is recorded in the product and a subset of that recorded content is selected and output during playback of the audiovisual product according to a particular user identity.

The present invention has many advantages as can be seen from the above description and from carrying out embodiments of the present invention. In particular, a single version of the audiovisual product is recorded for distribution to a large number of users. The same audiovisual product is distributed to each user, giving a simpler and more reliable distribution. The audiovisual products are personalised upon playback according to a user identity received from the user and personally identifying playback content is produced in an overt way so as to be readily visible during playback and/or in a discrete way which is unobtrusive during playback. The personalised information is embedded within the audio and/or video playback and any copy of the audiovisual output is immediately traceable to the identified user. This acts as an effective deterrent against unauthorised copying.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiments(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A method to deter copying of an audiovisual product, comprising the steps of:
   allocating a plurality of user identities to a plurality of users;
   recording the audiovisual product with a plurality of sections of playback content including, for each of the plurality of user identities, at least one section of personal playback content which is uniquely attributable to the respective user identity;
   recording a navigational structure of the audiovisual product, said navigational structure being adapted for reproducing a said at least one section according to a said user identity, said navigational structure comprising a plurality of sequence instructions to reproduce some or all of the sections of playback content in a specified order;
   receiving one of the user identities upon playback of the audiovisual product and selecting one of the recorded sequence instructions according to the received user identity, the structural location of the corresponding sequence instruction selected directly from the received user identity or by performing a transformation of the received user identity; and
   replaying the recorded audiovisual product including selecting and replaying the respective at least one section of personal playback content according to the received user identity.

2. The method of claim 1, wherein each of the user identities is unique to an authorized user or to a group of authorized users in the plurality of users.

3. The method of claim 1, wherein each user identity comprises an identity code allocated to a respective user or group of users.

4. The method of claim 1, wherein the method comprises providing a user database including, for each of the plurality of user identities, a user identity code and personal data of a respective user.

5. The method of claim 4, wherein the method comprises preparing a plurality of video or audio assets including, for each of the plurality of user identities, an asset containing the personal data of a respective user.

6. The method of claim 5, comprising automatically creating the plurality of assets from the personal data stored in the user database.

7. The method of claim 1, wherein each of the sections of playback content corresponds to video, audio or sub-picture data, or any combination thereof.

8. The method of claim 1, wherein each of the sections of playback content includes a cell as a minimum playback unit of the audiovisual product.

9. The method of claim 1, further comprising distributing identical copies of the audiovisual product to each of the plurality of users.

10. The method of claim 1, wherein the receiving step includes an authentication process for validation of the user.

11. The method of claim 1, wherein the user identity is received in the form of an unlock code to unlock the audiovisual product.

12. The method of claim 1, wherein the receiving step comprises receiving the user identity by the user entering their user identity to a numerical keypad.

13. The method of claim 1, further comprising recording at least one common section of playback content to be reproduced for all of the plurality of users.

14. The method of claim 13 comprising, upon playback, replaying the at least one common section of playback content.

15. The method of claim 14, comprising providing one or more erroneous watermarks within the common content and which are common to all users of the audiovisual product.

16. The method of claim 1, wherein the personal playback content is overt and readily apparent visually and/or aurally during reproduction of the audiovisual product.

17. The method of claim 1, wherein the personal playback content is discrete and not readily noticeable during playback.

18. The method of claim 1, wherein the personal playback content is interleaved amongst sections of common content.

19. The method of claim 1, comprising dividing the audiovisual product into a plurality of cells, and recording the cells amongst at least first and second different video streams.

20. The method of claim 19, comprising creating and recording at least one video stream switch instruction in order to automatically switch from the first video stream to the second video stream during playback of the audiovisual product.

21. The method of claim 20, wherein the video stream switch instructions comprises one or more forced activate button commands associated with hidden menu buttons in a video object which precedes a multi-angle block.

22. The method of claim 1, wherein the audiovisual product is playable according to a DVD- Video specification.

23. The method of claim 1, comprising recording the audiovisual product onto a portable random-access storage medium.

24. The method of claim 1, comprising recording the audiovisual product onto an optical disc according to a DVD-Video specification.

25. A method to deter copying of an audiovisual product, comprising the steps of:
   allocating a plurality of user identities to a plurality of users;
   recording the audiovisual product with a plurality of sections of playback content including, for each of the plurality of user identities, at least one section of personal playback content which is uniquely attributable to the respective user identity, the playback content further including at least one common section of playback content to be reproduced for all of the plurality of users, the common section of playback content providing one or more erroneous watermarks;
   recording a navigational structure of the audiovisual product, said navigational structure being adapted for reproducing a said at least one section according to a said user identity;
   receiving one of the user identities upon playback of the audiovisual product; and replaying the recorded audiovisual product including the at least one common section and selecting and replaying the respective at least one section of personal playback content according to the received user identity.

26. The method of claim 25, wherein said navigational structure of the audiovisual product comprises a plurality of sequence instructions to reproduce some or all of the sections of playback content in a specified order.

27. The method of claim 26, further comprising selecting on playback one of the recorded sequence instructions according to the received user identity, and thereby reproducing a sequence of sections of playback content to include the recorded section of personalized playback content unique to that respective user identity.

28. The method of claim 27, comprising selecting the structural location of the corresponding sequence instruction directly from the received user identity or by performing a transformation of the received user identity.

29. The method of claim 25, wherein the audiovisual product is playable according to a DVD-Video specification.

30. A method to deter copying of an audiovisual product, comprising the steps of:
    allocating a plurality of user identities to a plurality of users;
    recording the audiovisual product with a plurality of sections of playback content including, for each of the plurality of user identities, at least one section of personal playback content which is uniquely attributable to the respective user identity, the audiovisual product divided into a plurality of cells provided amongst at least a first and second different video streams;
    recording a navigational structure of the audiovisual product, said navigational structure being adapted for reproducing a said at least one section according to a said user identity, the navigational structure including at least one video stream switch instruction in order to automatically switch from the first video stream to the second video stream during playback of the audiovisual product;
    receiving one of the user identities upon playback of the audiovisual product; and
    replaying the recorded audiovisual product including selecting and replaying the respective at least one section of personal playback content according to the received user identity.

31. The method of claim 30, wherein said navigational structure of the audiovisual product comprises a plurality of sequence instructions to reproduce some or all of the sections of playback content in a specified order.

32. The method of claim 31, further comprising selecting on playback one of the recorded sequence instructions according to the received user identity, and thereby reproducing a sequence of sections of playback content to include the recorded section of personalized playback content unique to that respective user identity.

33. The method of claim 32, comprising selecting the structural location of the corresponding sequence instruction directly from the received user identity or by performing a transformation of the received user identity.

34. The method of claim 30, further comprising recording at least one common section of playback content to be reproduced for all of the plurality of users, the common section of content providing one or more erroneous watermarks.

35. The method of claim 30, wherein the audiovisual product is playable according to a DVD-Video specification.

\* \* \* \* \*